United States Patent [19]

Metcalfe

[11] 4,178,081
[45] Dec. 11, 1979

[54] SPECTACLES HINGE

[75] Inventor: Richard T. Metcalfe, Sturbridge, Mass.

[73] Assignee: American Optical Corporation, Southbridge, Mass.

[21] Appl. No.: 805,268

[22] Filed: Jun. 10, 1977

[51] Int. Cl.² .......................... G02C 5/22; G02C 5/14
[52] U.S. Cl. .................................. 351/153; 16/128 A; 351/121
[58] Field of Search ................ 351/121, 153, 141; 16/128 A, 128 R; 2/442, 443

[56] References Cited

U.S. PATENT DOCUMENTS

| | | | |
|---|---|---|---|
| 452,008 | 5/1891 | Willson | 351/97 |
| 452,009 | 5/1891 | Willson | 403/79 |
| 825,483 | 7/1906 | Riser | 403/71 |
| 1,708,202 | 4/1929 | Welsh et al. | 29/11 |
| 1,844,143 | 2/1932 | Bouchard | 351/99 |
| 2,192,208 | 3/1940 | Stevens | 351/148 |
| 2,428,645 | 10/1947 | Bausch | 351/141 |
| 2,745,314 | 5/1956 | Rabb | 16/128 R |
| 2,828,668 | 4/1958 | De Angelis | 351/9 |
| 2,926,381 | 3/1960 | De Angelis | 16/140 |
| 2,939,168 | 6/1960 | Ferron | 16/140 |
| 3,042,961 | 7/1962 | Tieri | 16/128 A |
| 3,104,416 | 9/1963 | Barker | 16/140 |
| 3,156,756 | 11/1964 | Seaver | 351/121 |
| 3,349,430 | 10/1967 | Rosenvold et al. | 16/128 A |
| 3,427,681 | 2/1969 | Smith | 351/153 UX |
| 3,524,216 | 8/1970 | Fernandez et al. | 16/128 R |
| 3,546,735 | 12/1970 | Liuataud | 16/128 A |
| 3,744,887 | 7/1973 | Dunbar | 351/153 |
| 3,826,565 | 7/1974 | Wenzel | 351/121 |

Primary Examiner—John K. Corbin
Assistant Examiner—Rodney B. Bovernick
Attorney, Agent, or Firm—Jeremiah J. Duggan; Alan H. Spencer; Stephen A. Schneeberger

[57] ABSTRACT

A hinge for connecting a temple to a spectacles frame front. One component of the hinge includes a metal fastening plate with spaced laterally extending ears forming a pair of hinge leaves between which an insert of plastic material is fitted. The insert covers innermost facing surfaces of the metal ears and is itself provided with an ear which forms an intermediate non-metallic leaf of the hinge component. When leaves of the one hinge component are interfitted with leaves of an all metal second hinge component, the resulting plastic-to-metal bearing surfaces afford smooth pivoting action with provision for tightening against drop temple.

9 Claims, 6 Drawing Figures

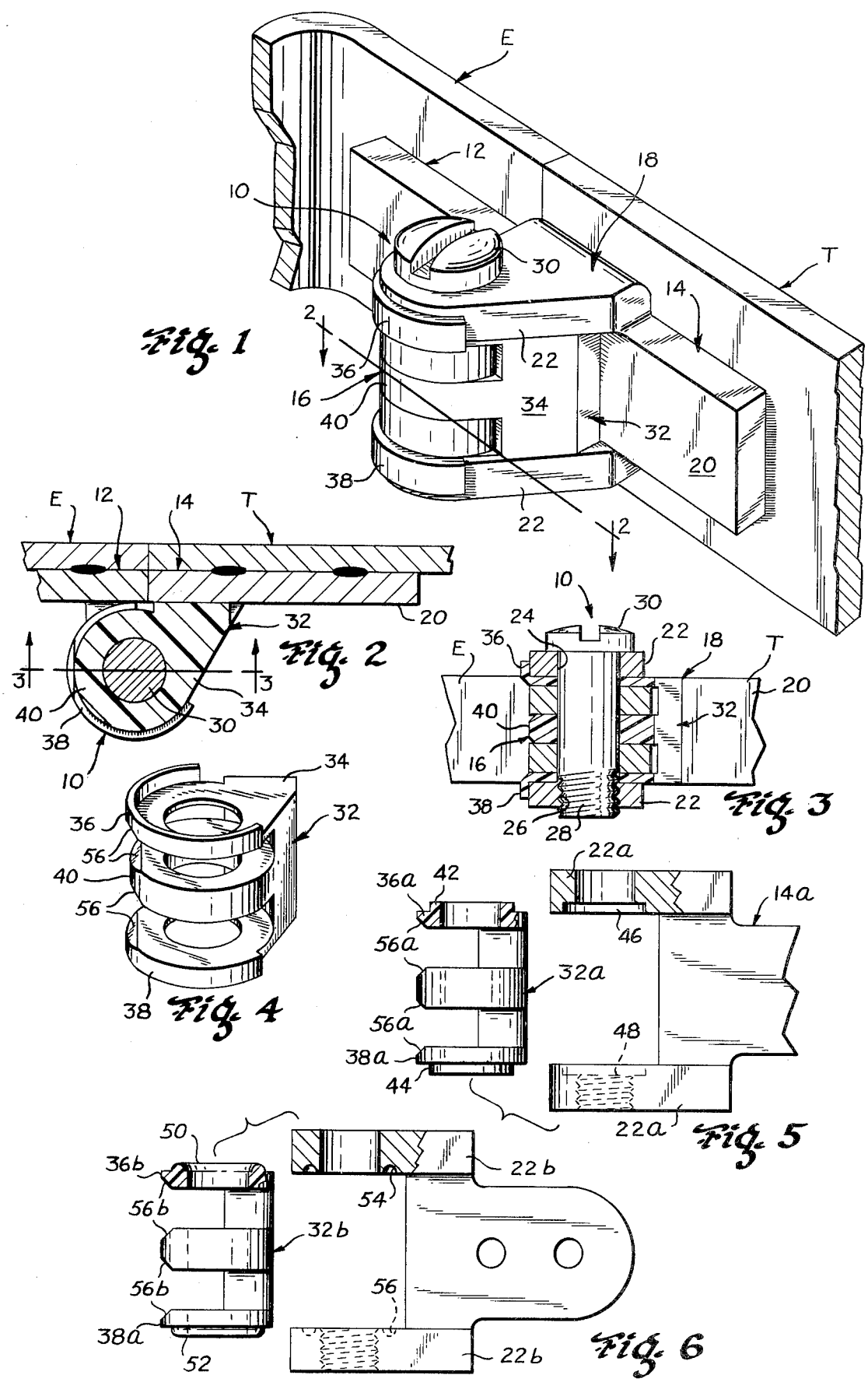

SPECTACLES HINGE

BACKGROUND OF THE INVENTION

1. Field of the Invention

This invention relates to hinges and has particular reference to improvements in hinges for spectacles frames.

2. Discussion of the Prior Art

Metal hinges used to pivotally connect temples to spectacles frame fronts of ophthalmic mountings are traditionally difficult and costly to manufacture and suffer the drawbacks of screws backing out with looseness of temple fit which is commonly referred to in the art as "drop temple". In the alternative of tightening against "drop temple", undue binding and/or roughness of pivoting action usually results from the metal-to-metal contact between leaves of the hinge barrel. Hinges of this type are illustrated in U.S. Pat. Nos. 825,483; 1,708,202; 1,844,143 and 3,826,565.

In addition to the high cost of equipment, repair and maintenance required to perform the operations necessary to produce and assemble spectacles hinges of the aforesaid types, the close tolerance control needed for assembly imposes the added drawback of uneconomical scrap yield. Tolerance accumulation from machining and electroplating build-up can render interleaving of the hinge components unusually difficult if not impossible in some cases.

In attempts to overcome the backing out of hinge screws and drop temples, various forms of non-metallic bushings or sleeves have been placed around the hinge screw which, when longitudinally compressed by tightening of the screw do relieve some of the screw loosening and drop temple problems. Non-metallic hinge pins have also been used. The drawbacks of metal-to metal contact between confronting surfaces of leaves of the hinge barrel are, however, not overcome and hinge binding or roughness of pivoting action can continue to be problematic. The structures depicted in U.S. Pat. Nos. 2,826,668; 2,926,381; 2,939,168; 3,042,961; 3,349,430 and 3,546,735 are exemplary of this latter type of hinge construction.

The insertion of washers between leaves of hinge barrels, non-metallic hinge leaf boots and screw lock washers can also relieve drop temple problems, improve the pivoting action of spectacles hinges and at least to some extent relieve machining tolerances. These schemes, however, do not overcome the need for expensive hinge making equipment, its costly repair and maintenance. Furthermore, the costs of manufacturing the added number of minute hinge parts, their inventorying, special handling and ungainliness in assembly renders this approach to spectacles hinge construction relatively impractical and certainly uneconomical. U.S. Pat. Nos. 2,428,645; 2,192,208 and 3,427,681 are respectively illustrative of the screw lock washer, the interleaving washer and hinge leaf boot scheme.

Another prior art approach to avoiding problems of metal-to-metal hinge leaf interfitting is illustrated in U.S. Pat. Nos. 3,104,416 wherein a complete hinge component, i.e. hinge plate and all ears, is formed of plastic and is intended to interfit with a similar but all metal second hinge component. The advantages of this plastic-to-metal hinge leaf interfitting are, however, largely outweighed by the lack of ruggedness and resistance to breakage of the all plastic hinge component. In particular, the thin sections of joinder of ears of the main plate in the all plastic component are susceptible to breakage during spectacle frame assembly or in subsequent use. The minuteness of hinge size required in spectacle construction and considerable abuse needed to be resisted as well as the need for angular adjustment under use redners all plastic hinges or hinge halves impractical for long term use and particularly relatively unsuitable for use in high quality prescription ophthalmic mountings. Therein the weight of greater thickness and bulk of corrective lenses and/or ruggedness of frame structure dictate a need for the more durable metal or metal reinforced hinge components having a capability of withstanding the sometimes excessive handling and wearing abuses. Inexpensive sunglass spectacles having relatively short service lives are commonly provided with molded cast and/or machined all plastic hinges. Those illustrated in U.S. Pat. Nos. 3,156,756; 3,524,216 and 3,744,887 are exemplary. All plastic hinges serve the immediate purpose of cheapness of construction required of variety store type structures which are not intended or expected to withstand the abuse of long service.

Other inexpensive hinge constructions intended mainly for the low cost sunglass frame or disposable safety spectacles are stamped from thin sheet metal and bent into final shape. The structures of expired U.S. Pat. Nos. 452,008; 452,009 and 2,745,314 are exemplary of types of structures still in use. These hinges, however, suffer the already discussed drawbacks of metal-to-metal interleaving.

With the foregoing in view, the present invention has a principal objective of providing spectacles hinges of exceptionally high quality and of dependable long service life but of an uniquely simple and inexpensive construction which will overcome the traditional problems of screw back-out, drop temple, barrel binding and/or roughness of pivoting action all without need for expensive manufacturing equipment, its attending high repair and maintenance costs and difficult or tedious assembly operations.

It is another object of the invention to overcome the heretofore need for separately and uneconomically performed milling, blanking, drilling, piercing and tapping operations in the manufacture of high quality long service life spectacles hinges.

Still another object is to overcome prior art problems of interfitting barrel leaves in hinge assembly procedures and to avoid metal-to-metal hinge leaf contact while affording the sureness of a metal supported hinge construction needed for long service life in high quality ophthalmic spectacles and further with applicability to any and all types of spectacles.

Other objects and advantages of the invention will become apparent from the following description.

SUMMARY OF THE INVENTION

The aforesaid and corollary objects of the invention are accomplished by forming a main body member of a hinge component (hinge half) from metal strip stock, preferably in a progressive die, to the final configuration of a hinge fastening plate having laterally extending ears making up two leaves of the ultimate hinge barrel. A molded or otherwise formed plastic insert adapted to cover the innermost facing surfaces of the two ears and including an intermediate nonmetallic hinge ear is snapped in place between the two metal ears to complete the structure. The thus completed three-eared hinge half may then be interleaved with an all metal two-eared second hinge half and afford plastic-to-metal bearing surfaces in the resulting hinge barrel for smooth low coefficient of friction pivoting action and tightening against drop temple without subsequent screw back-out. Principles of the invention are also applicable to three and seven-eared, i.e. three and seven barreled, hinges and others.

Details of the invention will become more readily apprent from the following description when taken in conjunction with the accompanying drawings

IN THE DRAWINGS

FIG. 1 is a greatly enlarged illustration, in perspective, of a preferred embodiment of the invention;

FIG. 2 is a horizontal cross-sectional view of the spectacles hinge taken from the position of a plane extending through line 2—2 of FIG. 1;

FIG. 3 is a vertical cross sectional view taken in a plane extending through line 3—3 of FIG. 2;

FIG. 4 is an illustration, in perspective, of one component of the hinge assembly shown in FIGS. 1-3;

FIG. 5 is a disassembled partially cross-sectioned hinge half wherewith a modification of the invention is depicted; and FIG. 6 is a view similar to FIG. 5 of another modification of the invention.

DESCRIPTION OF THE PREFERRED EMBODIMENTS

Referring more particularly to FIGS. 1-4 of the drawings, hinge 10 comprises a pair of interleaved hinge components, i.e hinge halves 12 and 14, wherein the invention is incorporated in hinge half 14.

While hinge 10 is illustrated as having a barrel 16 made up of five ears or leaves which is commonly referred to in the art as a "five barrel hinge", it will become readily apparent hereinafter that the invention is generally as applicable to three and seven barrel hinges and others.

Referring more particularly to hinge half 14, its construction comprises a main body 18 including plate section 20 and laterally extending ears 22 preferably formed of a metal or metal alloy capable of being heat treated for permanent shape retention after final working. A highly desirable metal alloy is disclosed in U.S. Pat. application Ser. No. 591,189, now U.S. Pat. No. 4,046,596, filed on June 27, 1975. Other metals or metal alloys may, of course, be used.

Main body 18 is preferably formed of strip stock in progressive die tooling. In semi-finished blanked form, i.e flat cut-to-shape state, hinge screw openings 24 and 26 (FIG. 3) are preferably die-formed or drilled and then brought into axial alignment with each other by bending ears 22 into the positions illustrated in FIGS. 1—3. Opening 26 is, at one stage of the forming process, internally threaded for reception of the threaded end 28 of hinge screw 30.

Completing the hinge half is separately cast, molded and/or machined insert 32 which is fitted between ears 22 against plate 20.

In the embodiment of insert 32 which is illustrated in FIGS. 1-3 it comprises a main supporting section 34 having upper and lower hinge ear covers 36 and 38 adapted to extend across the innermost or facing surfaces of hinge ears 22 of hinge barrel 16. Greater than semicircular marginal upstanding and depending rim portions of hinge ear covers 36 and 38 respectively are adapted to resiliently snap into place about corresponding sides of hinge ears 22 to fix the insert in place. Intermediately of hinge ear covers 36 and 38 is hinge ear 40 which makes up the third of the three leaves of hinge half 14. Coaxial openings through hinge ear covers 36 and 38 and leaf 40 are so located as to become aligned with openings 24 and 26 in main body 18 and receive hinge screw 30 when insert 32 is snapped into a position of use in hinge half 14. Insert 32 is preferably formed of a highly durable but resilient plastic material of low coefficient of friction such as nylon, a polyamide resin, polycarbonate or other synthetic resin or plastic substances commonly used as wear-resistant bearing material.

With hinge ear covers 36 and 38 and the all plastic hinge ear 40 of the five-barrel hinge construction illustrated in FIGS. 1-4, its barrel 16 is provided with all plastic-to-metal bearing surfaces which afford smooth pivoting action and allow for tightening of screw 30 to the extent necessary to prevent drop temples without adversely affecting the desirable smooth pivoting action. Screw 30, being threaded into the lowermost of ears 22 pivots with hinge half 14 during the hinging of temple T about a spectacles endpiece E.

Hinge plate 20 is illustrated in FIGS. 1-3 as being spot welded to temple T which is intended to pivot about endpiece E. However, various other means of attaching hinge plate 20 to a spectacles temple may be used. For example, hinge plate 20 may be perforated and pinned or rivoted to the spectacles temple if desired. Such a perforated hinge plate is illustrated in the embodiment of the invention of FIG. 6 which will be described shortly. It should also be understood that the arrangement of hinge halves 12 and 14 of FIGS. 1-3 may be reversed if desired, i.e. hinge half 14 may be affixed to a spectacles endpiece E and hinge half 12 attached to a spectacles temple T.

While the FIGS. 1-4 embodiment of the invention is illustrated in a five barrel type hinge, it should be apparent that insert 32 may be modified to include a second hinge ear 40 between ear covers 36 and 38 and thereby receive three all metal hinge ears of another hinge half to make up a seven barrel hinge construction. Alternatively, for a three leaved or three barrel hinge construction, insert 32 may be modified by elimination of hinge ear 40 whereby a single all metal hinge ear may be received between ear covers 36 and 38.

A modification of the invention is illustrated in FIG. 5 wherein hinge half 14a and plastic insert 32a are similar to the corresponding parts of spectacles hinge 10. In this form of the invention, however, hinge ear covers 36a and 38a are provided shoulders 42 and 44 respectively adapted to snap into receiving recesses 46 and 48 respectively in hinge ears 22a of hinge half 14a. This locks insert 32a in place.

In FIG. 6, another modification of the invention is illustrated wherein plastic insert 32b is adapted to be snapped into hinge ears 22b of hinge half 14b in a manner similar to insert 32a of the FIG. 5 embodiment. In the case of insert 32b, however, shoulders 50 and 52 are of semiconductor cross sectional configuration and are received by similarly semi-circularly sized and shaped annular grooves 54 and 56 respectively in hinge ears 22b. The semicircular cross-sectional configuration of shoulders 50 and 52 facilitates the assembling of insert 32b in hinge half 14b.

In all cases of all inserts 32, 32a and 32b an edge of their hinge ear cover sections and intermediate all plastic ears are preferably notched at one side, e.g. as illustrated by notches 56, 56a and 56, so as to facilitate the entering of ears of another hinge half, e.g. hinge half 12, into place.

In all cases of all assemblies of the illustrated embodiments of the invention, the resulting plastic-to-metal bearing surfaces afford smooth pivoting action with screw tightening against drop temple and prevention of screw back-out.

Those skilled in the art will appreciate that there are various other modifications and/or adaptations of the precise forms of the invention here shown and that the foregoing illustrations are not to be interpreted as restrictive of the invention beyond that necessitated by the following claims.

I claim:

1. The improvement in an interleaved hinge for a spectacles frame wherein a first of two hinge halves comprises:
   a main supporting body including the integral structure of a plate for securing the first hinge half to the spectacles frame and an ear extending laterally from each of two opposite edges of said plate adjacent one end thereof, said ears providing barrel leaves of said first hinge half and being coaxially apertured for receiving a hinge screw; and
   an insert between said ears of said main body, said insert including a portion covering each of facing surfaces of said two ears with space therebetween for receiving a number of barrel leaves of a separate second half of said hinge, said insert including an integral additional ear between said surface covering portions, said additional ear providing a third barrel leaf of said first hinge half; and
   means on each of said surface covering portions of said insert for fixing said insert against accidental displacement from said main supporting body.

2. The improvement in a hinge according to claim 13 wherein said main supporting body of said first hinge half is formed of metal and said insert including said surface covering portions and additional ear is formed of a non-metallic material.

3. The improvement in a hinge according to claim 2 wherein said non-metallic insert is comprised of a highly wear-resistant low coefficient-of-friction plastic material and affords plastic-to-metal bearing surfaces for smooth pivoting action when said number of barrel leaves of said second half of second hinge are formed of metal and interleaved with said first hinge half.

4. The improvement in a hinge according to claim 2 wherein said insert includes a plurality of non-metallic ears between said surface covering portions.

5. The improvement in a hinge according to claim 1 wherein the aperture in one of said ears of said main supporting body is internally threaded for receiving a threaded end of a hinge screw extended through said coaxially apertured ears of said main supporting body.

6. A spectacles frame hinge half comprising:
   a main supporting body including the integral structure of a plate for securing the hinge half to a spectacles frame and an ear extending laterally from each of two opposite edges of said plate adjacent one end thereof, said ears providing barrel leaves of said hinge half and being coaxially apertured for receiving a hinge screw;
   an insert between said ears of said main body, said insert including a portion covering each of facing surfaces of said two ears with space therebetween for receiving a number of barrel leaves of a separate second hinge half, said insert including an integral additional ear between said surface covering portions, said additional ear providing a third barrel leaf of said first mentioned hinge half; and
   means on each of said surface covering portions of said insert for preventing its accidental displacement from said main supporting body.

7. The improvement in a hinge half according to claim 6 wherein said main supporting body of said one hinge half is formed of metal and said insert is formed of a non-metallic material.

8. The improvement in a hinge half according to claim 7 wherein said insert includes a plurality of non-metallic ears between said surface covering portions.

9. The improvement in a hinge half according to claim 6 wherein the aperture in one of said ears of said main supporting body is internally threaded for receiving a theaded end of a hinge screw extended through said coaxially apertured ears of said main supporting body.

* * * * *

UNITED STATES PATENT AND TRADEMARK OFFICE
CERTIFICATE OF CORRECTION

PATENT NO. : 4,178,081
DATED : December 11, 1979
INVENTOR(S) : Richard T. Metcalfe It is certified that error appears in the above-identified patent and that said Letters Patent are hereby corrected as shown below:

Column 1, line 68, change "of", third occurrence to - to -

Column 2, line 6, change "redners" to --renders--;

Column 3, line 39, change "generally" to --equally--;

Column 5, line 2, change "56", second occurrence, to --56b--. Line 38 change "13" to --1--.

Signed and Sealed this

First Day of April 1980

[SEAL]

Attest:

SIDNEY A. DIAMOND

Attesting Officer

Commissioner of Patents and Trademarks